March 3, 1953 H. A. RAHMEL 2,630,366

SYSTEM FOR DETERMINING THE AUDIENCE RESPONSE TO PROGRAMS BROADCAST FROM WAVE SIGNAL TRANSMITTING STATIONS

Filed Nov. 9, 1946 4 Sheets-Sheet 1

INVENTOR.
Henry A. Rahmel
BY Mueller and Mason
Attorneys

March 3, 1953 H. A. RAHMEL 2,630,366

SYSTEM FOR DETERMINING THE AUDIENCE RESPONSE TO PROGRAMS BROADCAST FROM WAVE SIGNAL TRANSMITTING STATIONS

Filed Nov. 9, 1946 4 Sheets-Sheet 2

*INVENTOR.*
Henry A. Rahmel

*BY* Mueller and Mason

Attorneys

March 3, 1953 H. A. RAHMEL 2,630,366

SYSTEM FOR DETERMINING THE AUDIENCE RESPONSE TO PROGRAMS BROADCAST FROM WAVE SIGNAL TRANSMITTING STATIONS

Filed Nov. 9, 1946 4 Sheets-Sheet 3

INVENTOR.
Henry A. Rahmel
BY Mueller and Mason
Attorneys

March 3, 1953 H. A. RAHMEL 2,630,366

SYSTEM FOR DETERMINING THE AUDIENCE RESPONSE TO PROGRAMS BROADCAST FROM WAVE SIGNAL TRANSMITTING STATIONS

Filed Nov. 9, 1946 4 Sheets-Sheet 4

*INVENTOR.*
Henry A. Rahmel

BY Mueller and Mason

Attorneys

Patented Mar. 3, 1953 2,630,366

UNITED STATES PATENT OFFICE 2,630,366

SYSTEM FOR DETERMINING THE AUDIENCE RESPONSE TO PROGRAMS BROADCAST FROM WAVE SIGNAL TRANSMITTING STATIONS

Henry A. Rahmel, Evanston, Ill., assignor to A. C. Nielsen Company, Chicago, Ill., a corporation of Illinois Application November 9, 1946, Serial No. 708,861

17 Claims. (Cl. 346—37)

Figure 1:
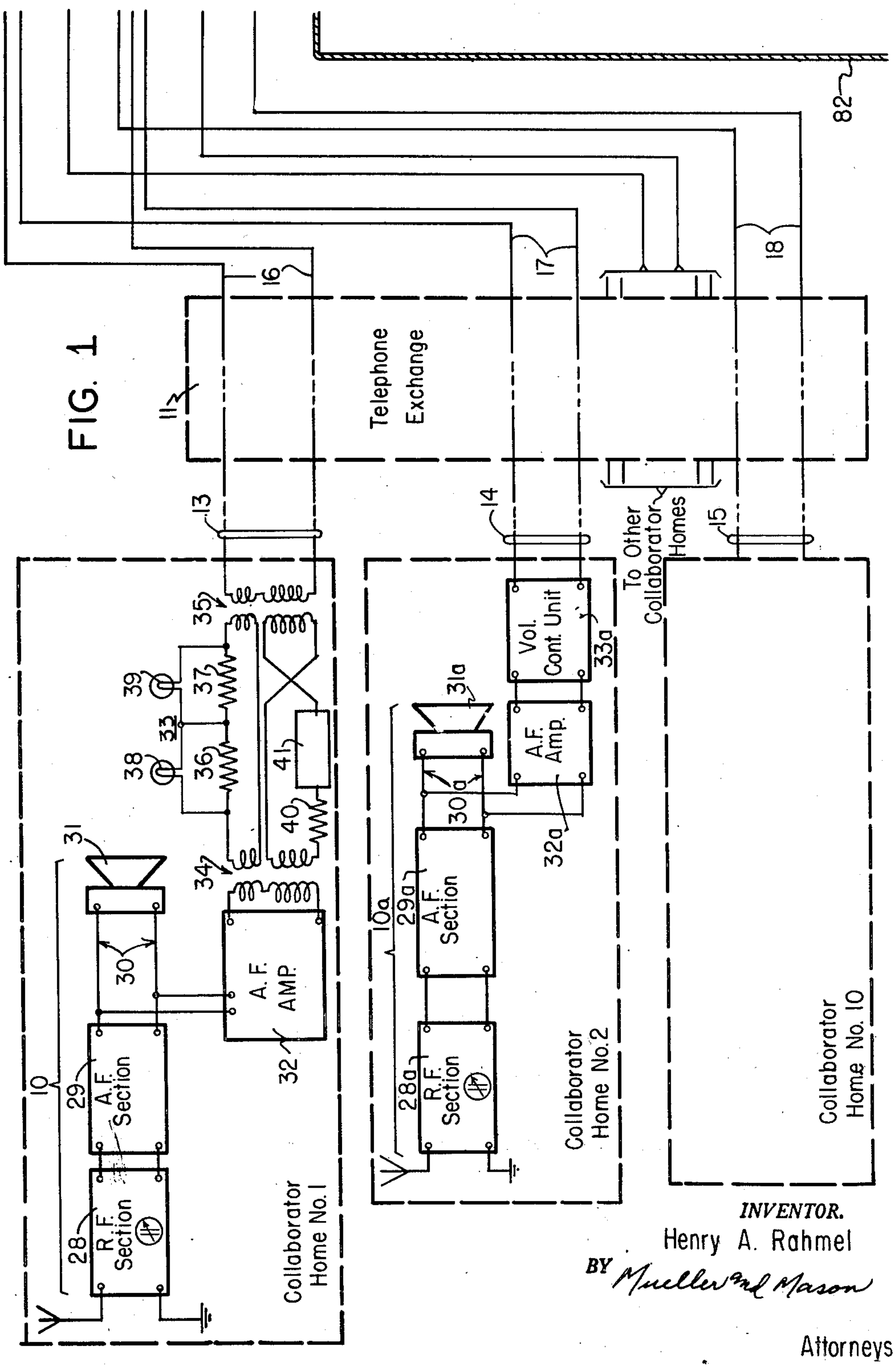

The present invention relates to wave signal receiver monitoring systems and more particularly to an improved system for monitoring one or more wave signal receivers to determine the extent of use of each receiver and the particular programs received and translated by each receiver. In particular, the present improved system is well adapted for use in determining the listening habits of wave signal receiver users.

One of the principal objectives in determining the listening habits of home radio receiver users is that of determining the effectiveness of radio advertising. Generally speaking, the effectiveness of any particular program as an advertising media is directly related to the following factors:

1. The average size of the listening audience.
2. The average period of listening to a particular program, i. e. the "holding power" of the program.
3. Variations in the size of the listening audience on a periodic basis in order (*a*) to permit detection of program components which cause audience gains or losses, (*b*) to determine which types of commercial message cause audience loss, and (*c*) to locate commercials during program periods when the audience is large, etc.

The first method of sampling used in attempts to obtain this information is the so-called telephone-call method which involves the making of hundreds of personal telephone calls to random selected homes during the period when a particular program of interest is in progress and statistical analysis of the results to determine the extent of listening. In addition to the uncontrolled uncertainties introduced by human judgment, there are, basically, a number of defects in this method which destroy the accuracy of the results obtained. Thus it is entirely impossible to obtain information concerning factors 2 and 3 above when this method of sampling is used. These defects have led to the development of instrumented methods of sampling which do not require active audience collaboration, provide a great deal more important information than the telephone-call sampling technique, and eliminate entirely the errors inherent in the telephone-call sampling technique.

Instrumentation involves the use of a recording device operating in conjunction with each collaborator receiver used in the sampling system to record the extent of use of the receiver and to record, as a function of time, the transmitters to which the receiver is tuned for program reception. While systems of the character described have in practice produced entirely satisfactory results, they are relatively expensive in instrument cost and maintenance due to recorder duplication at the collaborator homes and the fact that relatively frequent service calls at each of a large number of collaborator homes are required in order to collect the recorded information and check the operation of the recorder provided in the home.

It is an object of the present invention, therefore, to provide an improved signaling system.

Another object of the present invention is to provide a new and improved signaling system for monitoring the use and operation of one or more wave signal receivers.

It is another object of the invention to provide an improved signaling system of the character described in which exceedingly simple and inexpensive facilities requiring no appreciable servicing and no service calls for record information collection purposes are provided in functional association with the receiver at each system collaborator's home.

It is a further object of the invention to provide a signaling system of the character described which provides for simple, reliable and precisely accurate central office recording of the essential information regarding the use of one or more remotely located wave signal receivers.

According to still another object of the invention, a system arrangement is provided which permits common recording facilities to be used at the central office in recording information received from a plurality of remotely located wave signal receivers.

In accordance with a further and more specific object of the invention, facilities are provided in the system for producing distinguishable record indications of the periods of use and non-use of each wave signal receiver and the particular programs received during each use period, and for correlating the first-mentioned record indications with additional record indications which identify the wave signal receivers to which the first-mentioned record indications correspond.

According to a further object of the invention, the program identification recording operation is simplified by a system of program matching wherein the program being received at each monitored receiver is successively matched or compared with the programs being radiated from a plurality of wave signal transmitters and a record indication identifying the program being received is produced only when a match is established.

In accordance with a still further object of the invention, transmission of the program identification signals from each monitored receiver to the central office is facilitated and simplification of the equipment provided at each receiver is achieved by electrically matching the audio signals of the programs received at each monitored receiver with the audio signals of the programs radiated from the wave signal transmitters of interest.

Figure 2:
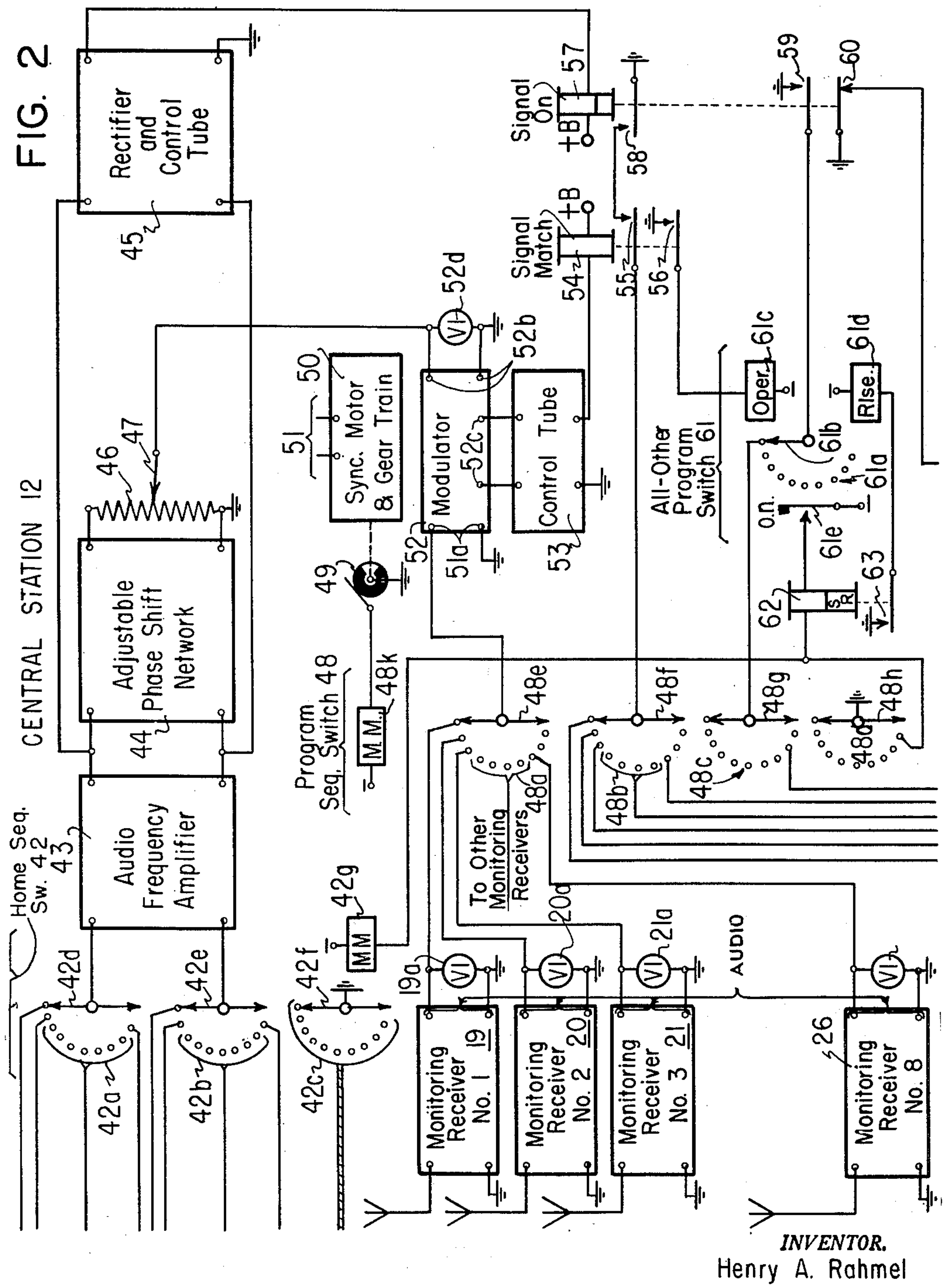
Figures 3, 5:
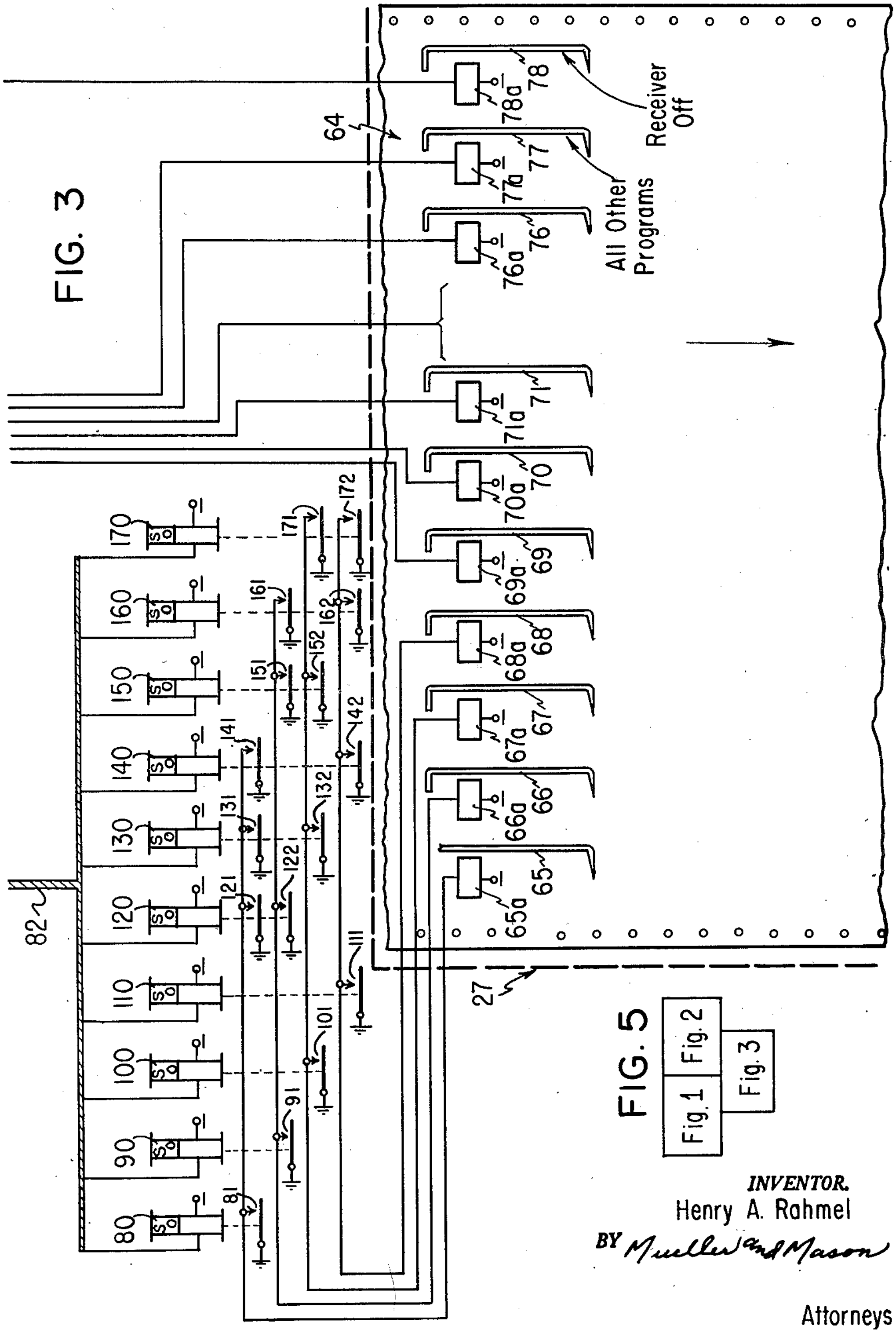
Figure 4:
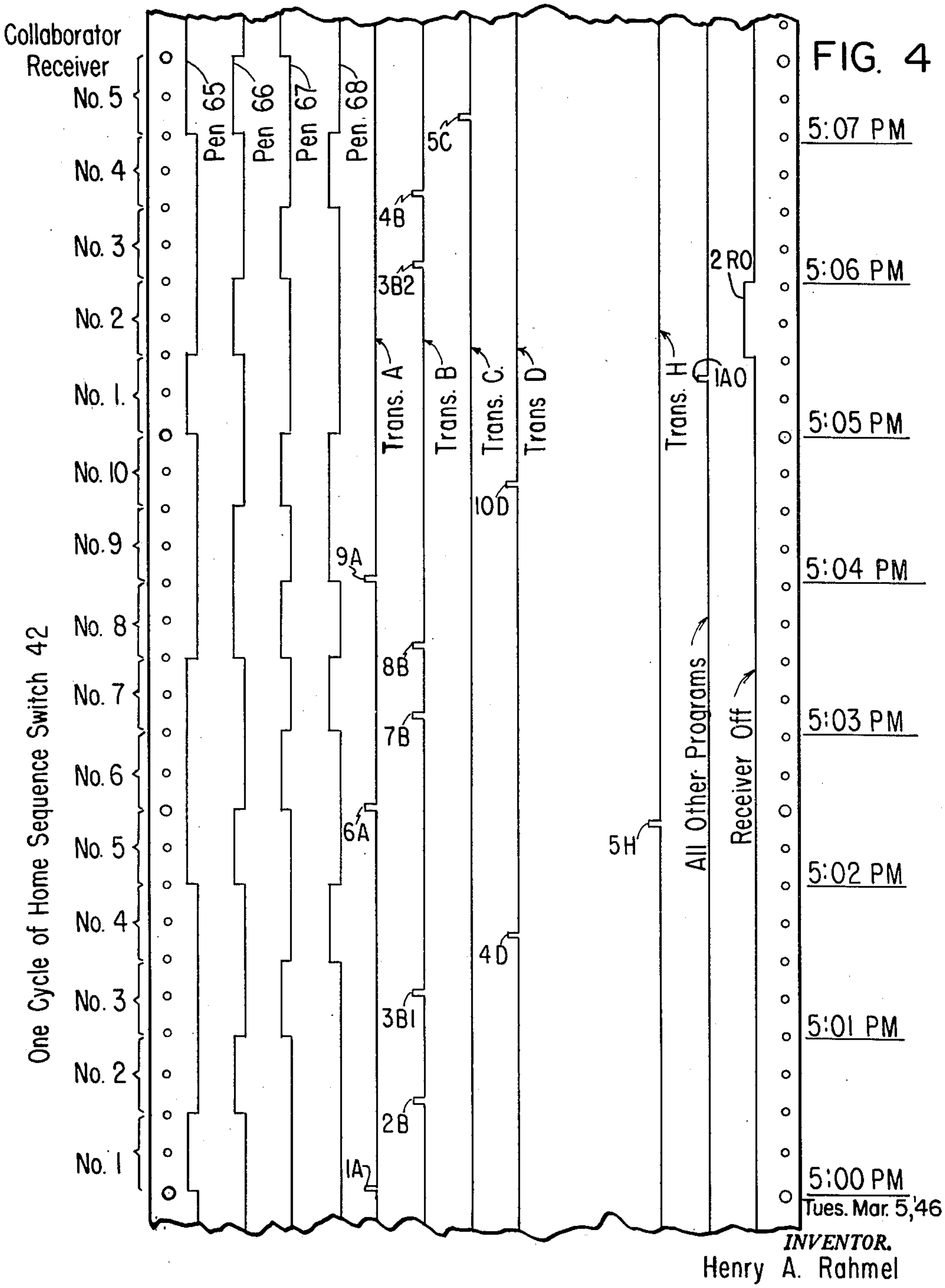

The invention, both as to its organization and method of operation, together with further objects and advantages thereof, will best be understood by reference to the following specification taken in connection with the accompanying drawings in which:

Figs. 1, 2 and 3 when arranged in the manner shown in Fig. 5 illustrate a signaling system characterized by the features of the present invention; and Fig. 4 illustrates a typical record segment resulting from operation of the system.

Referring now more particularly to the drawings, the present improved system is illustrated as employed to monitor and provide record information at a central station 12 of the particular programs being received at each of a plurality of wave signal receivers 10, 10*a*, etc., respectively, located in ten different collaborator homes. The ten monitored wave signal receivers 10, 10*a*, etc., respectively, provided at the different collaborator homes may accurately be regarded as different audio frequency signal sources of unknown signal patterns in that each receiver may be tuned for the reproduction of program signals derived from different transmitters and carrying different programs. These signals as respectively derived from the several receivers are transmitted to the central station 12 by way of voice frequency communication channels which commonly extend through a telephone exchange 11. Thus, program signals derived from the receiver 10 are transmitted to the central station 12 over a first two-wire audio frequency communication channel 13, a connection within the telephone exchange 11 and a second two-wire audio frequency communication channel 16. Similarly, telephonic channels 14 and 17 interconnected through a circuit within the exchange 11 are utilized in the transmission of program signals from the radio receiver 10*a* located at the collaborator home No. 2 to the central station 12. An identical channel comprising a pair of two-wire sections 15 and 18 connected within the exchange 11 is similarly utilized to interconnect the wave signal receiver provided at the collaborator home No. 10 with the central station 12. If desired from an economic standpoint, radio or carrier links may be used in transmitting the program signals from the variout collaborator homes to the central station 12.

The monitored receivers 10, 10*a*, etc., as provided at the different collaborator homes may, of course, be of any commercial type. Regardless of this fact, however, all known commercial receivers are equipped with program signal channels over which the detected signal voltages are transmitted to the driving coil of a loud speaker or equivalent electrical transducer. Thus, the receiver 10 as provided at the collaborator home No. 1 may be of the well known superheterodyne type comprising a radio or high frequency section 28 and a program signal or audio frequency section 29, the output terminals of which are connected by way of the voice coil leads 30 to a loud speaker 31. Corresponding portions of the receiver 10*a* provided at the collaborator home No. 2 are identified by the same reference numerals distinguished by the addition of the subscrip *a*. Each of the receivers 10, 10*a*, etc., is conventionally equipped with the usual tuning facilities and with volume control facilities through adjustment of which the loud spreaker output level may be changed as desired. Although the system is herein described in its use to monitor receivers of the audio reproducing type, it will be understood from the following explanation that it is equally applicable for use in monitoring receivers of the visual reproducing type, i. e., television receivers.

For the purpose of feeding the program signals from the program signal channel of the receiver 10 to the channel 13 at a satisfactory transmission level and at a reasonably controlled signal level, the voice coil leads 30 are coupled to the channel 13 through an audio frequency amplifier 32 of appropriate gain, and an automatic level-control unit 33 having the function of maintaining the signal input level to the channel 13 substantially constant within approximately a 3 db range regardless of variations in the signal input level to the amplifier 32. In the usual installation, a single tube audio frequency amplifier 32 will be found to be entirely adequate to hold the signal input level to the volume control unit 33 above the predetermined threshold value required for satisfactory operation of this unit regardless of the volume setting of the volume control facilities embodies in receiver 10. Suitable operating voltages for this amplifier may be derived from the power pack of the receiver 10 in any convenient manner.

Preferably the automatic level-control unit 33 is of the recently developed thermistor type described for example in the December 1945 issue of the publication, "Oscillator." In brief, this unit is essentially a hybrid coil arrangement comprising an input transformer 34, the primary winding of which is coupled to the output terminals of the amplifier 32, and an output transformer 35, the secondary winding of which is bridged across the two conductors of the channel 13. Two oppositely phased link circuits are used to interconnect the two secondary windings of the transformer 34 with the two primary windings of the transformer 35. The upper one of these two links serially includes a pair of resistors 36 and 37, respectively shunted by resistance lamps 38 and 39 having the function of maintaining the series impedance of the link substantially constant regardless of the magnitude of current flow in the link. The second or lower link is oppositely phased at the input side of the transformer 35 and serially includes a resistor 40 matching the resistor 36 and shunt lamp 38 in resistance value and a thermistor resistor 41 having the function of varying the series impedance of the link inversely in accordance with the amplitude of signal current flow therein. Specifically, this resistor has a relatively large negative temperature coefficient of resistance such that as the signal input level to the link increases to increase the current flow therein the resistor becomes heated to decrease the resistance of the link, and vice versa.

More specifically, the signal voltage introduced into the volume control unit 33 at the output side of the amplifier 32 during operation of the receiver 10 is divided between the two described links to produce oppositely phased voltages across the balanced primary windings of the transformer 35. If the series resistance of these two links were equal, the voltages developed across the primary windings of the transformer 35 would cancel so that no signal voltage would appear across the secondary winding of this transformer. At low signal input levels, however, the series resistance of the upper link is relatively low whereas that of the lower link is very high such that the voltage appearing across the upper primary winding of the transformer 35 greatly predominates over that appearing across the lower primary winding of this transformer. Thus, a voltage is induced in the secondary winding of the output transformer 35 to appear across the conductors of the channel 13. With increasing signal input levels to the control unit 33, signal current flow through the resistor 41 increases to effect a decrease in the resistance of this resistor (through heating of the resistor) and a resultant increase in signal current flow through the lower primary winding of the transformer 35. Thus, the increased signal current flow through the upper primary winding of this transformer is counterbalanced by an equal or greater increase in signal current flow through the lower primary winding of the transformer to prevent any appreciable rise in the average level of the signal voltage developed across the conductors of the channel 13. The opposite action occurs when the signal input level to the control unit 33 decreases. It will thus be apparent that the control unit 33 performs the function of maintaining the signal input level to the channel 13 reasonably constant regardless of the volume setting of the volume control facilities provided in the amplifier 10. It has been found, moreover, that this is accomplished without producing any significant distortion of the audio frequency signal transmitted.

It will be understood that identical signal feed facilities are provided in association with each of the other collaborator receivers. Thus, an audio frequency amplifier 32*a* and a volume control unit 33*a* identical in construction with the corresponding units 32 and 33, are connected in tandem in the order named between the voice coil leads 30*a* of the receiver 10*a* and the signal channel 14 for the purpose of delivering undistorted program signals of constant level over this channel and the connected channel 17 to the central station 12. The purpose of providing the volume control units 33, 33*a*, etc., in individual association with the collaborator receivers 10, 10*a*, etc., is that of preventing signal cross-feed between the channels extending through the telephone exchange 11 over which the program signals are transmitted from the respective collaborator homes to the central station 12. If radio links are used for signal transmission purposes, the volume control units are used to prevent over-modulation of the signal carriers.

At the central station 12, the signals of unknown signal pattern as derived from the monitored receivers 10, 10*a*, etc. are successively and sequentially compared with the audio frequency signals of known signal pattern derived from a plurality of monitoring receivers 19, 20, 21, 26, etc. In the illustrated system, these monitoring receivers are individually and continuously tuned to monitor different wave signal transmitters. In other words, the monitoring receiver 19 is tuned continuously to receive program signals radiated from one particular transmitter, the second monitoring receiver 20 is tuned continuously to receive programs originating at a second transmitter, the monitoring receiver 21 is tuned continuously to receive program signals originating at a third transmitter, and so on. The monitoring receivers may be of any desired commercial type, each being provided with suitable tuning facilities, volume control facilities, and an audio frequency channel over which the program signals are delivered to the output terminals of the receiver. Provisions are made in the system for comparing the program signals derived from the ten monitored receivers 10, 10*a*, etc., with the program signals reproduced by as many as eight monitoring receivers which respectively receive programs from eight different wave signal transmitters hereinafter arbitrarily designated as transmitters A, B, C, D, E. F, G and H.

For the purpose of comprising the signals of unknown audio frequency characteristics or signal patterns derived from the monitored receivers 10, 10*a*, etc., with the audio frequency signals of known signal patterns, i. e. programs of known identity, as delivered by the monitoring receivers 19, 20—26, the signal voltages transmitted to the central station 12 over the respective audio frequency communication channels are successively impressed upon the input terminals of an audio frequency amplifier 43 through the contacts and wipers of a home-sequence switch 42 of the well known rotary type. From the audio frequency amplifier 43, the program signals are delivered to the input side of an adjustable phase shift network 44, the output terminals of which are bridged by a potentiometer resistor 46. This resistor is equipped with a sliding wiper 47 which may be adjusted as desired to impress any desired part of the voltage appearing across the resistor 43 upon the input terminals 52*b* of a modulator 52 in which the signals of unknown pattern are successively compared with the signals of known pattern derived from the several monitoring receivers. Preferably the modulator 52 is of the exact form described in the Bell System Technical Journal, volume 18, 1939, at pages 315 to 337, inclusive. It is, provided with a second set of input terminals 52*a* to which signals from the monitoring receivers 19, 20, 21, etc., are successively delivered through the contacts and wipers of a program sequence switch 48. This modulator is also provided with a set of output terminals 52*c* which are connected to control the bias impressed between the input electrodes of a control tube 53, the output circuit of which includes the operating winding of a signal match relay 54. More specifically, the modulator 52 is of the well known ring type and is so connected and arranged that an appreciable direct current voltage is developed across the output terminals 52*c* thereof when signal voltages of matching phase and amplitude are simultaneously impressed across the two sets of input terminals 52*a* and 52*b* thereof. This means that an appreciable voltage is developed across the output terminals 52*c* only when the signals derived from one of the monitored receivers 10, 10*a*, etc., match the signals derived from one of the monitoring receivers 19, 20, 21, etc. On the other hand, when no signal voltage is impressed across the input terminals 52*b* or signal voltages of non-matching phase and amplitude are impressed across the two sets of input terminals of the modulator, no appreciable voltage is developed across the output terminals 52*c*. The control tube unit 53 may be of any conventional form and has the function of utilizing the direct current voltage impressed thereon when matching signal voltages are impressed upon the input terminals of the modulator 52 to produce sufficient current flow through the relay 54 to effect operation of this relay, and of preventing this relay from operating under all other conditions. To this end, the control tube of the unit 53 is normally biased beyond cut-off and the voltage developed across the modulator output terminals 52*c* during a matching signal period is used to decrease this bias sufficiently to produce operation of the relay 54.

Since the monitored receivers 10, 10*a*, etc., may each be capable of receiving programs originating at wave signal transmitters other than the transmitters A, B, C, etc., which the receivers 19, 20, 21, etc., are respectively provided to monitor, it may not infrequently occur that signals are transmitted to the central station 12 from one or more of the receivers 10, 10*a*, etc., which do not match the signals developed at the output side of any one of the monitoring receivers 19, 20, 21, etc. In order to record indications of such periods of reception at the monitored receivers, means comprising a rectifier and control tube unit 45, a signal-on relay 57 and an all-other programs switch 61 are provided to operate in conjunction with the program sequence switch 48 in selectively controlling the recording facilities described below. More specifically, the input terminals of the rectifier and control tube unit 45 are bridged across the output terminals of the audio frequency amplifier 43 and the output circuit of this unit is connected serially to include the operating winding of the signal-on relay 57. In brief, the unit 45 includes a rectifier section which functions to rectify signal voltages delivered thereto from the amplifier 43, and a control tube which is biased beyond cut-off by the rectified signal voltage to prevent the signal-on relay from operating so long as signal input to the amplifier 43 continues. Thus, the relay 57 is only conditioned for operation when no signals appear at the output side of the audio frequency amplifier 43. In this regard, it is noted that anode potentials are supplied to the anodes of the control tubes respectively provided in the units 45 and 53 through the operating windings of the relays 57 and 54, respectively.

The all-other programs switch 61 is of the well known minor type conventionally employed in signaling circuits of the character under consideration. In brief, this switch comprises a single set of contacts 61*a*, a wiper 61*b*, and an operating magnet 61*c* operative in conjunction with an associated ratchet and pawl mechanism, not shown, to drive the wiper 61*b* over the contacts of the bank 61*a*, a release magnet 61*d* which when energized permits the spring biased wiper 61*b* to restore automatically to normal, and a set of off-normal springs 61*e*. Energization of the release magnet 61*d* is under the control of a slow-to-release relay 62 which, in turn, is arranged for energization under the selective control of the program sequence switch 48.

The program sequence switch 48 is of the well known ten point rotary type conventionally employed in telephone and related signaling circuits. In brief, this switch comprises four sets of contacts 48*a*, 48*b*, 48*c* and 48*d*, each of ten points; wipers 48*e*, 48*f*, 48*g*, 48*h* individually associated with the four contact sets; and an operating magnet 48*k* which is operative to drive the enumerated wipers step-by-step over the contacts of their respective associated contact sets. In order periodically to energize the operating magnet 48*k* of the program sequence switch 48 thereby to advance the wipers 48*e*, 48*f*, 48*g* and 48*h* on a step-by-step basis and thus sequentially connect the output terminals of the eight monitoring receivers 19, 20, etc., to the input terminals 52*a* of the modulators 52, a rotatable pulsing element 49 is provided which is adapted to be driven at a precisely constant speed by means of a synchronous motor and gear train unit 50. The motor provided in this unit is adapted to be energized from any suitable commercial current source of constant frequency indicated by the bracketed terminals 51.

As indicated above, the home sequence switch 42, so-called because it has the function of sequentially associating the monitored receivers 10, 10*a*, etc., of the collaborator homes with the input terminals 52*b* of the modulator 52, is also of the well known rotary type. Specifically, this switch comprises three sets of contacts 42*a*, 42*b*, and 42*c*; wipers 42*d*, 42*e*, and 42*f* individually associated with the enumerated contact sets; and an operating magnet 42*g* which is operative in conjunction with an associated ratchet and pawl mechanism, not shown, to drive the identified wipers step-by-step over the contacts of their respective associated contact sets. The first two contact sets 42*a* and 42*b* are utilized to terminate opposite sides of the signal channels 16, 17, 18, etc. Thus, the upper side of the channel 16 is terminated at the first contact in the contact set 42*a* whereas the lower side of this channel is terminated at the first contact of the contact set 42*b*. Similarly, the upper and lower sides of the second channel 17 are respectively terminated at the second contacts of the two contact sets 42*a* and 42*b*. Energization of the operating magnet 42*g* is under the control of the program sequence switch 48. More specifically, the arrangement is such that the switch 42 is operated at the rate of one step for each operating cycle of the program sequence switch 48.

As pointed out above, comparison of the signals derived from the monitored receivers with the signals derived from the monitoring receivers is carried out on a phase and amplitude basis. It is for this reason that the adjustable phase shifting network 44 is provided, the purpose of this network being to establish phase coincidence between the signals of unknown pattern derived from the monitored receivers and the signals of known pattern derived from the monitoring receivers. If desired or necessary, phase shifting networks individual to the signal channels connecting the collaborator homes with the central station 12 may be employed in each of the channels 16, 17, 18, etc. ahead of the home sequence switch 42 in the central station 12. To provide for matching of the signals derived from the monitored and monitoring receivers on an amplitude basis, a volume indicator 52*d* is connected across the input terminals 52*b* of the modulator 52 to supply an indication of the level of the program signal input to this modulator from the monitored receivers. This level may, of course, be changed as required through suitable adjustment of the wiper 47 along the potentiometer resistor 46. Similarly, the output terminals of the monitoring receivers 19, 20, 21, 26, etc. are respectively bridged by volume indicators 19*a*, 20*a*, 21*a*, 26*a*, etc., for the purpose of indicating the signal output levels of these receivers. The volume control devices of these receivers may be adjusted as desired to establish the required signal output levels.

For the purpose of producing record indications of the particular programs received and reproduced at the monitored receivers 10, 10a, etc., and the additional record information described more fully below, the recording apparatus illustrated in Fig. 3 of the drawings is provided. This apparatus comprises a strip recorder 27 which may be of any desired commercial type, such, for example, as that described and illustrated in United States Letters Patent No. 2,132,808, granted October 11, 1938, to Arthur T. Sigo. In brief, this recorder comprises a paper record strip 64 movable between supply and take-up spools, not shown, and driven at constant speed by sprocket driving facilities, not shown, engageable with the edge perforations in the strip. Constant speed rotation of the driving sprockets may be obtained by employing a conventional synchronous motor and gear train unit, the synchronous motor of which is adapted for energization for any commercial source of alternating current of constant frequency. Multi-trace recording on the strip 64 is obtained by providing a plurality of scribing pens 65 to 71 inclusive, and 76 to 78 inclusive, each of which is normally spring biased to a neutral position. In order to operate these pens on an individual basis to positions wherein they inscribe off-trace lines upon the record tape 64, pen magnets 65a to 71a inclusive, and 76a to 78a inclusive, are provided in individual association with the described recording pens. In the illustrated arrangement, eight pens 69, 70, 71, etc., and 76 are provided which individually correspond to the eight wave signal transmitters A, B, C, etc., and H which are individually monitored by the monitoring receivers 19, 20, 21, etc. These pens are respectively and individually controlled through the first to eighth contacts of the contact set 48b embodied in the program sequence switch 48. The pen 77 is arbitrarily designated as an "all-other programs pen" for the reason that it is controlled through the ninth contact of the contact set 48c in the program sequence switch 48 and the first contact of the switch 61 to produce record indications of the fact that one or more of the monitored receivers is in use but is not receiving a program from one of the eight monitored wave signal transmitters. Similarly, the pen 78 is arbitrarily designated as a "receiver-off" pen for the reason that it is controlled through the contacts of the signal-on relay 57 to produce record indications identifying non-use periods of the monitored receivers. The first four pens, 65 through 68, are provided to produce record indications of the particular collaborator receivers which are sequentially associated with the above-described comparing equipment under the control of the home sequence switch 42.

In order to reduce the number of pens in the pen recorder 27 required to identify on an individual basis the ten monitored receivers which are selectively and sequentially associated with the program signal comparing equipment, the ten slow-to-operate coding relays 80, 90, 100, 110, 120, 130, 140, 150, 160 and 170 are provided directly to control the four pens 65 to 68, inclusive. These relays have their operating windings respectively wired to the ten contacts of the contact set 42c embodied in the home sequence switch 42 through the cable 82. Specifically, the operating winding of the relay 80 is wired directly to the upper or first contact of the contact set 42c, the operating winding of the second coding relay 90 is wired directly to the second contact of the contact set 42c, and so on. With this arrangement and as pointed out more fully below, a particular one of the ten coding relays is operated at each home selecting position of the sequence switch 42. Energizing current for the described relays, pen magnets and switch magnets is supplied from a suitable direct current source, not shown, having its positive terminal connected to a grounded bus conductor and its negative terminal connected to each illustrated winding terminal identified by the negative polarity symbol.

In considering the operation of the system, it will be understood that the ten monitored receivers 10, 10a, etc., respectively located in the different system collaborator homes are each susceptible to periods of use and non-use. Further, each receiver is tunable to receive program signals from any one of several different wave signal transmitters. In the particular area served by the described system, the monitoring receivers 19, 20, 21, etc., provided at the central station 12 are respectively tuned continuously to monitor the eight wave signal transmitters A, B, C–H, the program signals of which are most frequently received by the wave signal receivers located in this particular area. The purpose of the system is to provide on an accurately controlled chronology basis, a continuous record giving the following information in respect to each of the ten monitored receivers 10, 10a, etc., under observation.

1. The periods of use and non-use of each monitored receiver.
2. The particular wave signal transmitters to which each monitored receiver is tuned during each use period. This information permits the particular programs listened to in each collaborator home to be readily determined in interpreting or decoding the records.
3. Each period of time during which any one of the monitored receivers is tuned to receive program signals originating at transmitters other than the eight monitored transmitters.

In addition, the system is so arranged that each record indication representative of any one of the above items of information is correlated with a separate record indication which positively identifies the particular monitored receiver to which the item of recorded information pertains. To accomplish the above ends, the record tape 64 in the recorder 27 is continuously operated except for those periods when the system operation is interrupted for the purpose of changing record tapes. In effecting such a tape change, the exact instant of stopping tape movement is recorded on the tape and when a new tape is installed in the recorder, the exact instant of starting tape movement is likewise recorded on the tape. It will thus be apparent that the factor "time" is measured in terms of tape length and that the occurrence of the event resulting in production of any specific record mark may accurately be determined by ascertaining the position of the record mark longitudinally of the tape. The other equipment illustrated in Figs. 2 and 3 of the drawings is continuously operated.

Referring now more particularly to the specific mode of operation of the system, it will be understood that with the synchronous motor and gear train unit 50 in continuous operation, a circuit is periodically completed by the pulsing element 49 for energizing the operating magnet 48k of the program sequence switch 48. Each time this magnet is energized, it functions in cooperation with its associated ratchet and pawl mechanism to advance the wipers 48e, 48f, 48g, and 48h one step. Thus, as the magnet 48k is periodically energized, these wipers are driven in a counterclockwise direction sequentially to engage the different contacts of their respective associated contact sets. As a result, the output terminals of the eight monitoring receivers 19, 20, 21, etc., are successively connected to the input terminals 52a of the modulator 52.

Each time the wiper 48h of the program sequence switch 48 is operated to engage its associated tenth contact, an obvious circuit is completed for energizing the stepping magnet 42g of the home sequence switch 42. When thus energized, the magnet 42g functions to advance the wipers 42d, 42e and 42f one step in a counterclockwise direction. Thus, the wipers of the home sequence switch 42 are advanced at the rate of one step for each operating cycle of the program sequence switch 48. This means that during each interval when the home sequence switch 42 is positioned to deliver program signals from any one of the monitored receivers to the input terminals 52b of the modulator 52, the output terminals of all eight of the monitoring receivers 19, 20, 21, etc., are successively connected to the input terminals 52a of the modulator before the home sequence switch 42 is advanced. It further means that the signal transmission channels extending to the receivers provided in the ten different collaborator homes are successively connected to the modulator input terminals 52b. As this occurs, the coding relays illustrated in the upper portion of Fig. 3 of the drawings are selectively controlled to produce coded record indications specifically identifying the different receivers. Thus with the wipers of the switch 42 in engagement with their respective associated first contacts, such that the signal channel extending to the receiver 10 is connected to the modulator input terminals 52b, a circuit is completed through the wiper 42f and its engaged first contact for energizing the relay 80. With this relay energized, an obvious circuit is completed at the contacts 81 for energizing the magnet 65a. With this magnet energized, the pen 65 is deflected to inscribe an off-trace line upon the record tape 64. Similarly, when the switch 42 is advanced to bring the wipers thereof into engagement with their respective associated second contacts and thus operatively associate the receiver 10a with the modulator input terminals 52b, a circuit is completed through the wiper 42f and its engaged second contact for energizing the relay 90. With this relay operated, a circuit through the contacts 91 is completed for energizing the pen magnet 66a to cause deflection of the pen 66 and thus produce an off-trace line upon the record tape 64. The relays 100 and 110 similarly control directly and respectively the magnets 67a and 68a to cause the production of off-trace lines on the record tape 64 when the sequence switch 42 is operated to associate the third and fourth monitored receivers with the modulator 52. The remaining six coding relays are respectively operated only when the wipers of the sequence switch 42 engage the fifth to tenth contact of their respective associated contact sets to associate corresponding ones of the monitored receivers with the modulator 52. These relays, in operating, serve to energize the pen magnets 65a, 66a, 67a and 68a in coded combinations to produce corresponding coded combinations of off-trace lines on the record tape 64 which identify the various receivers. Specifically, this coding is accomplished in accordance with the following code pattern as will be evident from a study of the circuits controlled by the relays 120, 130, 140, 150, 160 and 170 and a study of the off-trace lines produced on the record strip in the manner shown in Fig. 4 of the drawings.

| Position of Switch 42 | Home Associated With Modulator 52 | Coding Relay Operated | Coding Relay Contracts Closed | Recording Pens Deflected |
|---|---|---|---|---|
| First | No. 1 | 80 | 81 | 65 |
| Second | No. 2 | 90 | 91 | 66 |
| Third | No. 3 | 100 | 101 | 67 |
| Fourth | No. 4 | 110 | 111 | 68 |
| Fifth | No. 5 | 120 | 121 and 122 | 65 and 66 |
| Sixth | No. 6 | 130 | 131 and 132 | 65 and 67 |
| Seventh | No. 7 | 140 | 141 and 142 | 65 and 68 |
| Eighth | No. 8 | 150 | 151 and 152 | 66 and 67 |
| Ninth | No. 9 | 160 | 161 and 162 | 66 and 68 |
| Tenth | No. 10 | 170 | 171 and 172 | 67 and 68 |

From a consideration of this table and Fig. 4 of the drawings, it will be readily apparent that different pens or combination of pens are operated to produce distinctive off-trace record lines respectively identifying the particular periods when the different monitored receivers 10, 10a, etc., are operatively associated with the comparing equipment shown in Fig. 2 of the drawings.

Briefly to consider the manner in which the comparing operations are effected, it may be assumed that during a particular period of use the monitored receiver 10 is tuned to receive program signals originating at the particular transmitter A which is being monitored by the receiver 19. During this use period and each time the sequence switch 42 is operated to connect the signal channel 16 to the input terminals of the amplifier 43, the program signals appearing between the voice coil leads 30 are amplified through the amplifier 32, limited as to amplitude in the volume control unit 33 and transmitted over the connected signal channels 13 and 16 and through the wipers 42d and 42e of the switch 42 to appear across the input terminals of the amplifier 43. Following amplification in this amplifier, the signals are impressed across the input terminals of the control and rectifier tube unit 45 to effect energization of the signal-on relay 57 in a manner clearly apparent from the above explanation. Specifically, the relay 57 is held operated so long as signal voltages are impressed across the input terminals of the amplifier 43. With this relay operated, a circuit is prepared at the contacts 58 for selectively energizing the magnets 70 to 76, inclusive, respectively corresponding to the wave signal transmitters A, B, C, etc., being monitored by the monitoring receivers 19, 20, 21, etc. At the contacts 59, a circuit is also prepared for energizing the operating magnet of the all-other programs pen 77. At the contact 60, the operating circuit for the magnet 78a of the receiver-off pen 78 is held open.

The signal voltages as derived from the program channel of the receiver 10 and reproduced in amplified form at the output side of the amplifier 43 are also delivered with a time delay through the phase shifting network 44 to appear across the potentiometer resistor 46. Depending upon the setting of the wiper 47, a variable portion of the voltage across the resistor 46 is impressed across the input terminals 52b of the modulator 52.

Before proceeding further with the explanation, it is pointed out that each program, regardless of the character thereof, i. e., whether a newscast, a symphony orchestra or a dance band, is characterized by an audio signal pattern of unique distinctiveness, instant by instant. In other words, the mathematical possibility of two different programs having the same audio frequency signal pattern is nil for all practical purposes. The purpose of the modulator 52 is to compare the pattern of the signal voltage impressed upon its input terminals 52b from the program signal channel of the receiver 10 (in the case under consideration) successively with the signal patterns of the signals developed at the output terminals of the eight monitoring receivers and to indicate a condition of match or non-match as the case may be. Specifically, when the wipers of the program sequence switch 48 are positioned to engage their respective associated first contacts, the signals appearing at the output side of the monitoring receiver 19 are impressed upon the input terminals 52a of the modulator 52. Since these signals have a pattern matching the pattern of the signals appearing across the modulator input terminals 52b, this modulator indicates the match by producing a voltage across its output terminals 52c having the effect of sufficiently reducing the bias between the input electrodes of the control tube 53 to effect operation of the signal match relay 54. In operating, this relay closes its contacts 55 to complete a circuit through the contacts 58 and the wiper 48f and its engaged first contact for energizing the operating magnet 69a of the pen 69. When thus energized, the magnet 69a deflects the pen 69 to produce an off-trace line on the record tape 64. This line, by virtue of its transverse position across the tape 64, positively identifies the transmitter A as the particular transmitter from which program signals are being received. Further, since the off-trace line is opposite a segment of the off-trace line being traced by the pen 65, the monitored receiver 10 is identified as the receiver at which the program signals are received. Inscription of the off-trace mark by the pen 69 continues until the wipers of the switch 48 are stepped to engage their associated second contacts under the control of the pulsing element 49. With the wipers of this switch engaging their associated second contacts, non-matching program signals are delivered from the monitoring receiver 20 to the input terminals 52a of the modulator 52. Accordingly, the voltage at the output terminals 52c of this modulator is reduced to effect a decrease in the current flow through the signal match relay 54 which causes this relay to release. Upon restoring, the relay 54 opens its contacts 55 to deenergize the pen magnet 69a and thus permit the pen 69 to return to its neutral position. In a similar manner, non-matching program signals are delivered to the input terminals 52a of the modulator 52 from the third to eighth monitoring receivers 21–26 as the wipers of the program sequence switch 48 are successively advanced to engage their respective associated third to eighth contacts under the control of the pulsing element 49. Hence, only one off-trace mark is produced on the record strip 64 during the operating cycle of the switch 48 in progress, and this mark is produced by the pen 69 to indicate that the receiver 10 was tuned to receive program signals from the transmitter A during the particular time period in which the described operating cycle of the sequence switch 48 occurred.

Another operation effected in response to operation of the signal match relay 54 as a result of matching of the received program signal from the receiver 10 with the program signals delivered from the monitoring receiver 19, is that of advancing the wiper 61b of the all-other programs switch 61 to prevent operation of the all-other programs pens 77 during the concluding part of the operating cycle of the switch 48. Specifically, the signal match relay 54, upon closing its contacts 56 at any point in the first part of each operating cycle during which the signals received from the monitored receivers are compared with the signals delivered by the eight monitoring receivers, energizes the operating magnet 61c over an obvious circuit. Thereafter, and when the relay 54 is deenergized in response to stepping of the switch 48 to a non-signal match position, the contacts 56 are opened to deenergize the magnet 61c, permitting the spring biased operating mechanism of this switch to advance the wiper 61b from its first home position into engagement with its associated second contact. As a consequence, the operating circuit for the magnet 77a is opened at the wiper 61b before the wiper 48g of the sequence switch 48 is advanced to engage its associated ninth contact. Hence, the pen 76 is prevented from operating to produce an off-trace indication on the record strip 64 that the monitored receiver 10 was tuned to receive programs signals from a transmitter other than the eight monitored transmitters. When the wiper 61b is thus stepped off-normal, the off-normal springs 61e are closed to prepare the operating circuit for the slow-to-release release relay 62.

Thereafter and when the wipers of the switch 48 are advanced to engage their associated tenth contacts, a circuit is completed at the wiper 48h for energizing the release relay 62 in parallel with the operating magnet 42g of the home sequence switch 42. In operating, the relay 62 closes its contacts 63 to energize the magnet 61d and thus effect restoration of the switch wiper 61b back to its normal or home position. Incident to release of the switch 61, the off-normal springs 61e are opened to deenergize the release relay 62. The latter relay in falling back opens its contact 63 to deenergize the magnet 61d. Thus, the all-other programs switch 61 is restored to normal to reprepare the operating circuit for the pen magnet 77a.

When the operating magnet 42g is energized in the manner just explained, its functions to advance the wipers of the home sequence switch 42 into engagement with their respective associated second contacts, thereby to effect deenergization of the coding relay 80, energization of the second coding relay 90, and connection of the signal channel extending to the monitored receiver 10a in the No. 2 collaborator home to the input terminals of the audio amplifier 43. In this regard, it is pointed out that the wipers 42d, 42e and 42f of the sequence switch 42 are of the non-bridging type such that signal voltage input to the amplifier 43 is momentarily interrupted during intercontact movement of these wipers. However, the signal-on relay 57 is of the well known slow-to-release type such that it does not fall back or release during intercontact movement of the home sequence switch wipers. Moreover, by using non-bridging wipers in this switch, overlapping operation of the coding relays 80, 90, etc., is positively prevented. Further to this end, these relays are designed to have slow-to-operate characteristics, thereby to insure release of any operated one thereof shortly prior to operation of another thereof.

After the receiver 10$a$ in the collaborator home No. 2 is operatively associated with the described comparing equipment in the central station 12, the program sequence switch 48 operates through another cycle in the exact manner explained above. In this regard, it will be understood that the operating magnet 42$g$ of the home sequence switch 42 is deenergized when the double ended wipers of the sequence switch 48 are advanced out of engagement with their respective associated tenth contacts and back into engagement with their respective associated first contacts. Assuming that the receiver 10$a$ is tuned for the reception of program signals from the transmitter B, which is monitored at the central station 12 by the monitoring receiver 20, the signal match relay 54 is operated in a manner fully apparent from the above explanation during the short interval when the wipers of the sequence switch 48 remain in engagement with their respective associated second contacts. In this case, the relay 54, in closing its contacts 55, completes an obvious circuit for energizing the magnet 70$a$ of the pen 70 which individually corresponds to the transmitter B. Thus, the pen 70 is actuated to inscribe an off-trace line on the record strip 64 opposite the off-trace line being inscribed by the pen 66, to provide a record indication that during the particular time interval covering the particular operating cycle of the switch 48 in progress, the receiver 10$a$ is tuned for the reception of program signals from the transmitter B. Here again, the pen 70 is the only one of the transmitter identification pens which is operated during the particular operating cycle of the sequence switch 48 in progress. Thus the signal match relay 54, upon operating, again closes its contacts 56 to energize the magnet 61$c$ and thus effect operation of the wiper 61$b$ to its first off-normal position, thereby to prevent energization of the magnet 77$a$ during the concluding part of the operating cycle of the switch 48. The switch 61 is restored to normal and the home sequence switch is advanced another step during the concluding part of the operating cycle of the program sequence switch 48 under consideration, all in the exact manner explained above.

From the foregoing explanation, it will be understood that as the home sequence switch 42 operates successively to associate the monitored receivers in the third to tenth collaborator homes with the comparing equipment provided in the central station 12, the pens of the recorder 27 are selectively controlled to produce record indications identifying the particular wave signal transmitters to which the respective collaborator receivers are tuned for the reception of program signals. It will further be understood that after the monitored receivers of all ten of the collaborator receivers have been tested, the home sequence switch 42 starts a second operating cycle to repeat the testing operation. In fact, this switch continues to operate on a cyclic basis, such that a continuous record is formed on the record strip 64 positively identifying any and all changes in the manner of use or operation of each of the ten collaborator receivers.

As pointed out above, it may not infrequently occur that one of the ten collaborator receivers will be tuned for the reception of program signals from a transmitter other than the eight transmitters being monitored. To assume an exemplary case, the receiver 10$a$ may during a given operating cycle of the home sequence switch 42 and a given operating cycle of the program sequence switch 48$b$ be tuned for the reception of program signals from a distantly located transmitter not ordinarily received by the receivers of the collaborator homes in the area in which the system is used. In such case, the signal match relay 54 is not operated during the initial portion of the operating cycle of the sequence switch 48 for the reason that the program signals impressed upon the modulator input terminals 52$b$ from the receiver 10$a$ do not match the program signals impressed upon the modulator input terminals 52$a$ from any one of the eight monitoring receivers 19, 20, etc. Accordingly, the wiper 61$b$ of the all-other programs switch 61 remains in its home position throughout the initial portion of the operating cycle of the sequence switch 48. When the wipers of the switch 48 are operated to engage their respective associated ninth contacts, however, a circuit is completed from ground at the contacts 59 of the operated signal-on relay 57 through the wiper 61$b$ and the wiper 48$g$ for energizing the magnet 77$a$ of the pen 77. Accordingly, the pen 77 is deflected to produce an off-trace mark indicating that the receiver 10$a$ is tuned for the reception of program signals from a non-monitored transmitter. Inscription of this off-trace mark only persists during the short interval when the wiper 48$g$ of the switch 48 is standing in engagement with its associated ninth contact. Moreover, when the wiper 48$h$ is stepped to engage its associated tenth contact, the release relay 62 is not energized due to the fact that the wiper 61$b$ has not been stepped off normal to effect closure of the off-normal springs 61$e$. Thus, facilities are provided in the system for producing record indications of those periods during which any one of the ten collaborator receivers is tuned for the reception of programs from non-monitored transmitters.

The system is also provided with facilities for recording non-use periods of the respective monitored receivers. Thus, the signal-on relay 57 is held operated under the control of the rectifier and control tube unit 45 only so long as signals are delivered to the input side of the audio frequency amplifier 43. This means that if the home sequence switch 42 is advanced to associate the receiver at the collaborator home No. 10, for example, with the central station comparing equipment during a period when this receiver is not in use, the signal-on relay 57 is deenergized and restored. In releasing, this relay opens its contacts 58 to interrupt a common point in the operating circuits for the transmitter identification pen magnets 69$a$ to 76$a$, inclusive. At its contacts 59, the relay 57 opens a point in the operating circuit for the pen magnet 77$a$ of the all-other programs pen 77. At its contacts 60, the relay 57 closes an obvious circuit for energizing the magnet 78$a$ of the receiver-off pen 78. Thus, the pen 78 is deflected to inscribe an off-trace line upon the record strip 64. Inscription of this off-trace line persists throughout the entire interval when the receiver at the collaborator home No. 10 is operatively associated with the comparing equipment at the central station 12. In other words, it is co-extensive in length with the off-trace segments being inscribed upon the record tape 64 by the pens 67 and 68 to identify the receiver at the collaborator home No. 10 as that being tested. When, however, the home sequence switch 42 is advanced to re-associate the receiver 10 with the comparing equipment at the central station, the signal-on relay 57 is re-operated, assuming that this receiver is in use. Upon re-operating, the relay 57 closes its contacts 58 and 59 to re-prepare the operating circuits for the pen magnets 69*a* to 77*a*, inclusive, and opens its contacts 65 to de-energize the pen magnet 78*a*. Thus, the pen 78 is restored to its neutral position to end the off-trace segment being inscribed thereby upon the record strip 64.

From the preceding explanation, it will be understood that the periodicity or rate at which the monitored receivers at the ten collaborator homes are successively tested depends upon the stepping speed of the program sequence switch 48 and hence the speed at which the pulsing cam 49 is operated. These speeds may be as rapid as desired within the capabilities of the switch 48. However, sufficient time must be allotted to each comparing operation to permit an accurate response of the signal match relay, the pen magnets and the all-other programs switch 61. Assuming that a three second interval is found to be adequate for program signal comparison and response of the recording pens, the speed of operation of the pulsing element 49 is set to produce a complete operating cycle of the program sequence switch 48 in 30 seconds. This necessarily means that a complete operating cycle of the home sequence switch 42 is produced in 5 minutes. With these speed constants, testing of the monitored receivers in the collaborator homes proceeds on a 5 minutes of listening time basis.

The character of a typical record formed upon a segment of the record strip 64 during a short period of operation of the system is well illustrated in Fig. 4 of the drawings. This record strip segment has been greatly exaggerated longitudinally of the strip in order to facilitate consideration of the off-trace record marks produced thereon and is assumed to cover a period of listening time extending from 5:00 p. m. to 5:07 p. m. on Tuesday, March 5, 1946. The significance of this record particularly will be readily apparent when considered with the following table.

| Off-Trace Mark | Home at which Program Received | Transmitter Radiating Received Program |
|---|---|---|
| 1A | No. 1 | A |
| 2B | No. 2 | B |
| 3B1 | No. 3 | B |
| 4D | No. 4 | D |
| 5H | No. 5 | H |
| 6A | No. 6 | A |
| 7B | No. 7 | B |
| 8B | No. 8 | B |
| 9A | No. 9 | A |
| 10D | No. 10 | D |
| 1A0 | No. 1 | (1) |
| 2R0 | No. 2 | None |
| 3B2 | No. 3 | B |
| 4B | No. 4 | B |
| 5C | No. 5 | C |

1 Nonmonitored transmitter.

From an inspection of the illustrated record segment and the table interpretation thereof, it will be understood that a 5:00 p. m. of the calender period in question the receiver 10 at the collaborator home No. 1 was tuned for the reception of program signals from the transmitter A and that within five minutes thereof, the receiver was retuned for the reception of program signals for a non-monitored transmitter. It will also be apparent that throughout the period in question, the transmitter provided at the collaborator home No. 3 remain tuned for the reception of program signals from the monitored transmitter B. Further, the receiver 10*a* provided at the collaborator home No. 2 which at 5:00 p. m. was tuned for the reception of program signals from the transmitter B was turned off prior to 5:06 p. m. The other record indications respectively provided by the identified off-trace marks will be readily apparent from inspection of the record segment shown in Fig. 4 of the drawings taken in connection with the foregoing table.

As indicated in the introductory portion of the specification, one important use of the present improved signaling system described above is that of determining the audience popularity or rating of particular programs transmitted from one or more wave signal transmitters. Generally speaking, the effectiveness of any particular program as an advertising media is directly related to the factors enumerated in the first part of this specification. It will also be apparent from the above explanation that accurate record information from which all of these factors may be ascertained is provided simply and rapidly by the present improved system. Moreover, accumulation of this information is accomplished while using extremely simple equipment at the receiver in each collaborator home and relatively simple equipment at each central station. In employing the described facilities for the specific application mentioned, it is contemplated that a number of systems of the character described may be used in different metropolitan areas each served by central station equipment of the character shown in Figs. 2 and 3 of the drawings. From the various central stations, the record strips, as extracted on a periodic basis from the recorders 27, may be mailed to the home office of the statistical organization operating the system for conversion into statistically analyzable form through the use of appropriate decoding equipment.

While there has been described what is at present considered to be the preferred embodiment of the invention, it will be understood that various modifications may be made therein which are within the true spirit and scope of the invention as defined in the appended claims.

I claim:

1. In a system for determining the audience response to programs broadcast from different wave signal transmitting stations, a monitored wave signal receiver tunable selectively to receive program signals from different transmitting stations operating at different frequencies, monitoring wave signal receiving means for receiving program signals from a plurality of said transmitting stations, comparing means, means for supplying to said comparing means signals indicative of the transmitting station to which said monitoring wave signal receiving means is tuned for program signal reception, means for supplying to said comparing means signals indicative of the transmitting stations to which said monitored receiver is selectively tuned for program signal reception, said comparing means being operative to compare the signals supplied thereto by said two last-named means, and means controlled by the output of said comparing means for producing distinguishable indications identifying the transmitting stations to which said receiver is selectively tuned for program signal reception.

2. In a system for determining the audience response to programs broadcast from different wave signal transmitting stations, a plurality of monitored wave signal receivers each tunable to receive program signals from transmitting stations operating at different frequencies, monitoring wave signal receiving means for receiving program signals from a plurality of said transmitting stations, comparing means, means for supplying to said comparing means signals indicative of the transmitting stations from which program signals are received by said monitoring wave signal receiving means, sequencing means for sequentially supplying to said comparing means signals indicative of the transmitting stations to which said monitored receivers are respectively tuned for program signal reception, said comparing means being operative to compare the signals supplied thereto by said two last-named means, and means controlled by the output of said comparing means for producing distinguishable indications identifying the transmitting stations to which said monitored receivers are respectively tuned for program signal reception.

3. In a system for determining the audience response to programs broadcast from different wave signal transmitting stations, a plurality of monitoring wave signal receivers respectively tuned to receive program signals from different transmitting stations operating at different frequencies, a monitored wave signal receiver tunable to receive program signals from any one of said transmitting stations, comparing means, means for supplying to said comparing means signals indicative of the transmitting stations to which said monitored receiver is selectively tuned for program signal reception, sequencing means for sequentially supplying to said comparing means signals indicative of the transmitting stations to which said monitoring receivers are respectively tuned for program signal reception, said comparing means being operative to compare the signals supplied thereto by said two last-named means, and means controlled by the output of said comparing means for producing distinguishable indications identifying the transmitting stations to which said monitored receiver is selectively tuned for program signal reception.

4. In a system for determining the audience response to programs broadcast from different wave signal transmitting stations, a plurality of monitoring wave signal receivers respectively tuned to receive program signals from different wave signal transmitting stations operating at different frequencies, a plurality of monitored wave signal receivers each tunable to receive program signals from any one of said transmitting stations, comparing means, sequencing means for sequentially supplying to said comparing means signals indicative of the transmitting stations to which said monitored receivers are respectively tuned for program signal reception, sequencing means for sequentially supplying to said comparing means signals indicative of the transmitting stations to which said monitoring receivers are respectively tuned for program signal reception, said comparing means being operative to compare the signals supplied thereto by said two last-named sequencing means, and means controlled by the output of said comparing means and responsive to the matching of the signals respectively received by said comparing means for producing distinguishable indications identifying the transmitting stations to which said monitored receivers are respectively tuned for program signal reception.

5. In a system for determining the audience response to programs broadcast from different wave signal transmitting stations, a plurality of monitoring wave signal receivers respectively tuned to receive program signals from different wave signal transmitting stations operating at different frequencies and each provided with an audio frequency channel in which the received program signals appear, a plurality of monitored wave signal receivers each tunable to receive program signals from any one of said transmitting stations and each provided with an audio frequency channel in which the received program signals appear, program signal comparing means, sequencing means for sequentially supplying said comparing means with program signals appearing in the audio frequency channels of said monitored receivers, sequencing means for sequentially supplying said comparing means with program signal appearing in the audio frequency channels of said monitoring receivers, said comparing means being operative to compare the program signals supplied thereto by said two last-named sequencing means, and means controlled by the output of said comparing means and responsive to the matching of the program signals respectively appearing in the audio frequency channels of said monitored and monitoring receivers for producing distinguishable indications identifying the transmitting stations to which said monitored receivers are selectively tuned for program signal reception.

6. In a system for determining the audience response to programs broadcast from different wave signal transmitting stations, monitoring wave signal receiving apparatus for receiving program signals from different wave signal transmitting stations operating at different frequencies, a monitored wave signal receiver tunable to receive program signals from any one of said transmitting stations and susceptible of periods of use and non-use, comparing means, means for supplying to said comparing means signals indicative of the transmitting stations to which said monitored receiver is selectively tuned for program signal reception, means for supplying to said comparing means signals indicative of the transmitting stations from which program signals are received by said monitoring wave signal receiving apparatus, sad comparing means being operative to compare the signals supplied thereto by said two last-named means, means controlled by the output of said comparing means for identifying the transmitting stations to which said monitored receiver is selectively tuned for program signal reception, and means controlled by said monitored receiver for identifying the periods when said monitored receiver is not receiving any program signals being received by said monitoring receiving apparatus.

7. In a system for determining the audience response to programs broadcast from different predetermined wave signal transmitting stations, monitoring receiving apparatus for receiving program signals from different wave signal transmitting stations operating at different frequencies, a monitored wave signal receiver selectively tunable to receive program signals from any one of said predetermined transmitting stations and also from other transmitting stations operating at still different frequencies, comparing means, means for supplying to said comparing means signals indicative of the transmitting stations from which program signals are received by said monitoring receiving apparatus, means for supplying to said comparing means signals indicative of the transmitting stations to which said monitored wave signal receiver is selectively tuned for program signal reception, said comparing means being operative to compare the signals suplied thereto by said two last-named means, and means controlled by the output of said comparing means for identifying the ones of said different transmitting stations from which program signals are received by said monitored receiver and for identifying the periods during which program signals are received by said monitored receiver from said other transmitting stations.

8. In a system for determining the audience response to programs broadcast from different wave signal transmitting stations, a plurality of monitoring wave signal receivers respectively tuned to receive program signals from different wave signal transmitting stations operating at different frequencies, a plurality of monitored wave signal receivers each tunable to receive program signals from any of said transmitting stations, comparing means, cyclically operating means for sequentially supplying to said comparing means signals indicative of the program signals received by said monitored receivers, cyclically operating means for sequentially supplying to said comparing means signals indicative of the transmitting stations from which program signals are received by said monitoring receivers, said comparing means being operative to compare the signals supplied thereto by said two last-named means, means controlled by the output of said comparing means for producing distinguishable indications identifying the transmitting stations from which program signals are selectively received by said monitored receivers, and means responsive to operation of said first-named cyclically operating means for producing additional distinguishable indications identifying the monitored receivers to which the first-named indications respectively correspond.

9. In a system for determining the audience response to programs broadcast from different wave signal transmitting stations, a monitored wave signal receiver tunable selectively to receive program signals from different transmitting stations operating at different frequencies, a monitoring station remote from said monitored receiver and including monitoring wave signal receiving means for receiving program signals from a plurality of said transmitting stations, means operatively associated with said monitored receiver for transmitting to said monitoring station signals indicative of the transmitting stations to which said monitored receiver is selectively tuned for program signal reception, and means at said monitoring station responsive to the signals transmitted to said monitoring station from said monitored receiver and also responsive to the operation of said monitoring receiving means for producing indications from which may be determined the transmitting stations to which said monitored receiver is selectively tuned for program signal reception.

10. In a system for determining the audience response to programs broadcast from different wave signal transmitting stations, a plurality of monitored receivers each tunable selectively to receive program signals from different transmitting stations operating at different frequencies, means operatively associated with each of said receivers for producing a signal indicative of the transmitting station from which program signals are received by the associated receiver, signal responsive comparison means provided with two sets of input terminals, sequencing means for sequentially impressing the signals produced by said first-named means upon one set of input terminals of said comparison means, monitoring wave signal receiving means for receiving program signals from a plurality of said transmitting stations, and means operatively associated with said monitoring receiving means for impressing upon the other set of input terminals of said comparison means signals representative of the transmitting stations from which program signals are received by said monitoring receiving means, said comparison means being operatively responsive to the signals impressed upon its input terminals to produce indications from which may be determined the transmitting stations to which said monitored receivers are selectively tuned for program signal reception.

11. In a system for determining the audience response to programs broadcast from different wave signal transmitting stations, a monitoring station including monitoring wave signal receiving and translating apparatus for receiving program signals from transmitting stations operating at different frequencies and operative successively to develop signals indicative of the different transmitting stations from which program signals are received, a monitored wave signal receiver remotely located with respect to said monitoring station and selectively tunable to receive program signals from different ones of said transmitting stations, means operatively associated with said monitored receiver for transmitting to said monitoring station a signal indicative of the transmitting station to which said monitored receiver is tuned for program signal reception, and means at said monitoring station responsive to the signals developed by said receiving and translating apparatus and at the same time responsive to the signal transmitted to said monitoring station from said monitored receiver for identifying the transmitting stations to which said monitored receiver is tuned for program signal reception when the signals to which said last-named means responds coincidentally represent program signal reception from the same transmitting station by said monitored receiver and said monitoring wave signal receiving and translating apparatus.

12. In a system for determining the audience response to programs broadcast from different wave signal transmitting stations, a monitoring station including monitoring wave signal receiving and translating apparatus for receiving program signals from transmitting stations operating at different frequencies and operative successively to develop signals indicative of the different transmitting stations from which program signals are received, a plurality of monitored wave signal receivers respectively stationed in different collaborator homes each remotely located with respect to said monitoring station, each of said monitored wave signal receivers being selectively tunable to receive program signals from different ones of said transmitting stations, signal transmission links connecting said monitoring station with said monitored receivers and operative to transmit to said monitoring station signals respectively representative of the transmitting stations to which said monitored receivers are respectively tuned for program signal reception, means at said monitoring station responsive to the signals developed by said receiving and translating apparatus and at the same time responsive to the signal transmitted to said monitoring station from one of said monitored receivers over one of said links for producing indications from which may be determined the transmitting stations to which said one monitored receiver is tuned for program signal reception when the signals to which said last-named means responds coincidentally represent program signal reception from the same transmitting station by said one monitored receiver and said receiving and translating apparatus, and sequencing means at said monitoring station for sequentially connecting said links to said last-named means.

13. In a system for determining the audience response to programs broadcast from different wave signal transmitting stations, a monitoring station including monitoring wave signal receiving and translating apparatus for receiving program signals from transmitting stations operating at different frequencies and operative successively to reproduce the audio frequency components of the signals received from the different transmitting stations, a plurality of monitored wave signal receivers respectively stationed in collaborator homes each remotely located with respect to said monitoring station, each of said monitored wave signal receivers being selectively tunable to receive program signals from different ones of said transmitting stations and including an audio frequency section in which the audio frequency components of the signals received from said transmitting stations are reproduced, signal transmission links connecting the audio frequency sections of said monitored receivers with said monitoring station and operative to transmit to said monitoring station the audio frequency components of the signals respectively received by said monitored receivers, means at said monitoring station responsive to the audio frequency signals reproduced by said receiving and translating apparatus and at the same time responsive to the audio frequency signals transmitted to said monitoring station from one of said monitored receivers over one of said links for producing indications from which may be determined the transmitting stations to which said one monitored receiver is tuned for program signal reception when the audio frequency signals to which said last-named means responds are the same, and sequencing means at said monitoring station for sequentially connecting said signal transmission links to said last-named means.

14. A system for determining the audience response to programs broadcast from different wave signal transmitting stations, comprising a plurality of wave energy receiving stations variously located in different places and each including means for receiving broadcast programs from said different transmitting stations, an information gathering station, means for transmitting a received program from each of said receiving stations to said information gathering station, wave energy receiving means at said information gathering station for receiving the programs broadcast from said transmitting stations, and means for comparing the programs received from said receiving stations with the programs received from said transmitting stations by the wave energy receiving means at said information gathering station to produce indications from which may be determined the programs being received at said receiving stations.

15. A system for determining the audience reponse to programs broadcast from different wave signal transmitting stations, comprising a plurality of wave energy receiving stations variously located in different places and each including means for receiving broadcast programs from said different transmitting stations, an information gathering station, means for transmitting from each of said receiving stations to said information gathering station a signal indicative of the program being received at the receiving station, wave energy receiving means at said information gathering station for receiving programs from said transmitting stations and for producing signals indicative of the received programs, and means excited by the signals received from said receiving stations and the signals produced by the wave energy receiving means at said information gathering station for comparing the programs received at said receiving stations with the programs received by the wave energy receiving means at said information gathering station to produce indications from which may be determined the programs being received at said receiving stations.

16. A system for determining the audience response to programs broadcast from different wave signal transmitting stations, comprising a plurality of wave energy receiving stations variously located in different places and each including means for receiving broadcast programs from said different transmitting stations, an information gathering station, wire transmission means for transmitting a received program from each of said receiving stations to said information gathering station, wave energy receiving means at said information gathering station for receiving the programs broadcast from said transmitting stations, comparator means at said information gathering station for comparing the programs received from said receiving stations with the programs received from said transmitting stations by the wave energy receiving means at said information gathering station to produce indications from which may be determined the programs being received at said receiving stations, means for supplying the programs received by the wave energy receiving means at said information gathering station to said comparator means, and selector switch means for sequentially supplying the programs received from said receiving stations to said comparator means.

17. In a system for determining the audience response to programs broadcast from different wave signal transmitting stations, a wave signal receiver having signal reproducing means and including manually operable tuning means for selectively tuning said receiver to receive program signals for any desired length of time from any one of a plurality of transmitting stations operating at different frequencies, said receiver being provided with a high frequency section followed by a low frequency section in which detected signals appear for transmission to said reproducing means, indicating means, and means coupled to said low frequency section of said receiver at a point no further along said low frequency section of said receiver than the point of connection of said reproducing means thereto and at least in part responsive to signals appearing in said low frequency section of said receiver for controlling said indicating means to produce an indication uniquely identifying the particular transmitting station from which program signals are being received by said receiver.

HENRY A. RAHMEL.

REFERENCES CITED

The following references are of record in the file of this patent:

UNITED STATES PATENTS

| Number | Name | Date |
|---|---|---|
| 1,889,597 | FitzGerald | Nov. 29, 1932 |
| 1,934,879 | Potter | Nov. 14, 1933 |
| 2,176,742 | La Pierre | Oct. 17, 1939 |
| 2,213,886 | Potter | Sept. 3, 1940 |
| 2,354,836 | Rusch | Aug. 1, 1944 |
| 2,397,830 | Bailey | Apr. 2, 1946 |
| 2,405,238 | Seeley | Aug. 6, 1946 |
| 2,432,214 | Sontheimer | Dec. 9, 1947 |
| 2,436,235 | Sunstein | Feb. 17, 1948 |